United States Patent
Hagiwara et al.

[11] Patent Number: 5,840,157
[45] Date of Patent: Nov. 24, 1998

[54] DEINKING AGENT AND METHOD OF DEINKING THROUGH FLOTATION USING THE DEINKING AGENT

[75] Inventors: Masaaki Hagiwara; Yoshie Hirakouchi, both of Tokyo, Japan

[73] Assignee: Lion Corporation, Tokyo, Japan

[21] Appl. No.: 256,773

[22] PCT Filed: Feb. 10, 1994

[86] PCT No.: PCT/JP94/00200

§ 371 Date: Jul. 22, 1994

§ 102(e) Date: Jul. 22, 1994

[87] PCT Pub. No.: WO94/19532

PCT Pub. Date: Sep. 1, 1994

[30] Foreign Application Priority Data

Feb. 26, 1993 [JP] Japan ................................. 5-038430

[51] Int. Cl.[6] .................................................. D21C 5/02
[52] U.S. Cl. ........................ 162/5; 162/72; 162/DIG. 3
[58] Field of Search .......................... 252/60, 61, 108, 252/174.21, 174.22; 162/5.72, DIG. 3

[56] References Cited

U.S. PATENT DOCUMENTS

| | | | |
|---|---|---|---|
| 4,483,741 | 11/1984 | Maloney et al. ........................... | 162/5 |
| 4,964,949 | 10/1990 | Hamaguchi et al. ....................... | 162/5 |
| 5,223,089 | 6/1993 | Kato ........................................ | 162/5 |

FOREIGN PATENT DOCUMENTS

| | | | |
|---|---|---|---|
| 729070 | 3/1966 | Canada ..................................... | 162/5 |
| 2076308 | 3/1993 | Canada ............................ | D21C 5/02 |
| 197607 | 7/1976 | Japan . | |
| 63-165592 | 7/1983 | Japan . | |
| 62-243892 | 10/1987 | Japan ....................................... | 162/5 |
| 5071086 | 3/1993 | Japan . | |

OTHER PUBLICATIONS

Japanese Journal of Paper Technology, Aug. 1980, pp. 37–43.
T. W. Woodward, "Appropriate Chemical Additives are Key to Improved Deinking Operations," pp. 59–63, 1986 Pulp & Paper.

English language abstract of Japanese Patent No. 5–71086.
English language abstract of Japanese Patent No. 62–250291.
English lanugage abstract of Japanese Patent No. 55–51892.
English language abstract of Japanese Patent No. 53–31804.
English language abstract of Japanese Patent No. 62–177291.
English language abstract of Japanese Patent No. 63–165591.
English language abstract of Japanese Patent No. 63–85195.
English language abstract of Japanese Patent No. 51–13762.

*Primary Examiner*—Peter Chin
*Attorney, Agent, or Firm*—Morrison & Foerster LLP

[57] ABSTRACT

A deinking agent comprising a compound represented by the following general formula I is herein provided:

$$R^1O—(PO)m—(EO)n—(XO)k—R^2 \qquad (I)$$

(wherein $R^1$ represents an alkyl or alkenyl group having 12 to 22 carbon atoms; $R^2$ represents a hydrogen atom or an acyl group having 2 to 24 carbon atoms; PO, EO and XO represent a propylene oxide unit, an ethylene oxide unit and an alkylene oxide unit having not less than 3 cabon atoms, respectively; m=1~8; n=10~40; and k is such a number that the number of total carbon atoms present in the polymerized XO unit ranges from 3 to 120; the PO and EO in Formula (I) being added through block-addition). The use of the deinking agent in the deinking methods, in particular, the flotation method permits the preparation of high quality reclaimed pulp having high brightness and a low content of residual ink and also ensures stable operations for the methods.

15 Claims, No Drawings

DEINKING AGENT AND METHOD OF DEINKING THROUGH FLOTATION USING THE DEINKING AGENT

TECHNICAL FIELD

The present invention relates to a deinking agent for reclaiming waste paper used in preparing reclaimed pulp from printed waste paper such as newspaper, magazine, wood free paper, computer printout paper and copying paper, as well as a method for using the deinking agent.

More specifically, the present invention pertains to a deinking agent which is suitable for use in a process for deinking printed waste paper through flotation and which not only permits the preparation of high quality reclaimed pulp having high brightness and a low content of residual ink, but also ensures stable workability of the deinking method, as well as a method of using the deinking agent.

BACKGROUND ART

Printed waste paper has long been reclaimed to give a feedstock for papermaking. In particular, recently, the reclamation of printed waste paper has been increasingly important from the viewpoint of saving natural resources, energy saving and environmental protection and, along therewith, the reclaimed pulp have been required to have such high quality as high brightness and a low content of residual ink.

In general, the deinking methods are roughly divided into two groups, i.e., washing methods and flotation methods. There have been known and/or reported various articles and knowledges concerning these processing methods, deinking mechanisms and differences in quality between deinking agents used in these processing methods. These articles and knowledges are disclosed in, for instance, Pulp & Paper, 1986, November, p. 59; Japanese Journal of Paper Technology, 1980, August, p. 37; and U.S. Pat. No. 4,483, 741.

Having summarized the foregoing articles and knowledges and experiences obtained through previous practical operations, the washing method generally comprises the step of repeatedly diluting and/or dehydrating a pulp slurry defibered by a pulper, or separating the ink removed from starting waste paper and dispersed in the pulp slurry using a washing equipment such as a screen or a centrifugal cleaner. In this respect, the degree of ink-removal is greatly affected by, mainly, mechanical effects of washing equipments such as screw presses, screens, cleaners and filters. The washing method requires a large amount of water and, therefore, suffers from various problems from the viewpoint of saving natural resources and energy saving. Moreover, the washing method is greatly dependent upon mechanical effects of equipments used and accordingly, the workability in each step is regarded as of major importance. In particular, if a deinking agent having a strong foaming ability is used, various troubles in each equipment or step arise due to the foaming and this results in the reduction of workability and an increase of the electric power consumption and therefore, the deinking agent used in the washing method must have a low foaming ability or a foaming-inhibitory ability. Moreover, the removed ink particles must be finely dispersed in the pulp slurry for the improvement of the washing method in the deinking efficiency.

On the other hand, the flotation method comprises making to adhere removed ink particles to foams mainly generated in a flotator to thus separate the ink particles from the pulp and, in contrast with the washing method, the ink is removed mainly through chemical processes, i.e., the deinking mechanism of the flotation method is quite different from that of the washing method. In general, the deinking process which makes use of the flotation method comprises an optional step called as washing or dehydration step, but the ink is mainly removed in the flotation process. Moreover, the flotation method requires the use of water in an amount smaller than that required for the washing method and is thus also advantageous from the viewpoint of saving natural resources. In addition, ink particles removed during the flotation process in the flotation method must agglomerate into large particles having a large size as compared with the washing method for the improvement of the flotation method in the deinking efficiency. Furthermore, the flotation method requires appropriate degree of foaming ability during the flotation process since the flotation method separates removed ink particles through foaming. It has been well-known that the foaming ability required for the washing method is less than that required for the flotation method. On the other hand, the use of an agent, in particular, a deinking agent having an extremely high foaming ability makes it impossible to carry out stable operations and to, in some cases, prepare high quality reclaimed pulp having high brightness, since foams cannot be scraped out during the flotation process and various troubles arise due to foams in each step and this results in the shutdown of operations, the reduction of yield and hence the reduction in production capacity.

As has been discussed above, the washing and flotation methods substantially differ from one another in the deinking mechanism and, thereby the properties required for the deinking agents used in these methods are quite different from one another.

In Japan and Europe, the flotation method has principally been adopted since the method can, in particular, provide reclaimed pulp having brightness higher than that achieved by the washing method and is excellent from the viewpoint of saving natural resources and energy saving as compared with the washing method. In addition, the deinking method has recently been switched over from the washing method to the flotation method even in the United States.

Heretofore, there have been applied for many patents concerning deinking agents and methods of using the same. For instance, Japanese Un-examined Patent Publication No. Sho 55-51892 discloses a deinking method which makes use of a deinking agent obtained through adding a mixture of ethylene oxide with propylene oxide to the terminal hydroxyl groups of a propylene oxide-adduct of an alcohol and an alkylphenol in a degree falling within a certain range. The deinking agent used in this patent has a high content of ethylene oxide units in the terminal polyoxyalkylene groups on the order of 50 to 95 (% by weight) and the ethylene oxide units serve as hydrophilic groups. For this reason, the deinking agent shows a strong ink-dispersing ability and accordingly, the deinking agent does not permit efficient trap of ink particles. Moreover, the foaming ability of such a deinking agent having terminal hydrophilic groups is too strong to use in a flotator having a high gas/liquid ratio and frequently adopted recently and the deinking agent would adversely affect the workability because of, for instance, troubles due to foams.

Further, Japanese Examined Patent Publication No. Sho 51-13762 discloses the use of an alkylene oxide adduct of an alcohol in combination with a higher fatty acid capable of compensating the low ink-trapping property of the former during the flotation step. However, this method permits the improvement in the ink-trapping property during the flotation step, but is quite inferior in the ink-removing power if a feedstock has a high content of offset-printed waste paper due to the simultaneous use of the fatty acid, so that it cannot provide pulp of high quality.

DISCLOSURE OF THE INVENTION

An object of the present invention is to provide a deinking agent which can be used in a deinking method to obtain a high quality-reclaimed pulp having high brightness and a low content of residual ink and which can ensure stable workability of the deinking method. Another object of the present invention is to provide a method for deinking through a flotation process using the foregoing deinking agent.

The present invention has been completed on the basis of the following finding that the foregoing objects can effectively be accomplished by providing a deinking agent prepared through block-addition of propylene oxide and ethylene oxide, in this order, to hydrophobic group having a specific structure and then addition of a hydrophobic alkylene oxide or an acyl derivative thereof to the resulting adduct.

According to the present invention, there is provided a deinking agent comprising a compound represented by the following general formula I:

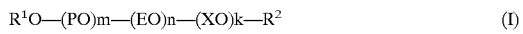

$$R^1O-(PO)_m-(EO)_n-(XO)_k-R^2 \quad \text{(I)}$$

(wherein $R^1$ represents an alkyl or alkenyl group having 12 to 22 carbon atoms; $R^2$ represents a hydrogen atom or an acyl group having 2 to 24 carbon atoms; PO, EO and XO represent a propylene oxide unit, an ethylene oxide unit and an alkylene oxide unit having not less than 3 cabon atoms, respectively; m=1~8; n=10~40; and k is such a number that the number of total carbon atoms present in the polymerized XO ranges from 3 to 120; the PO and EO in Formula I being added through block-addition).

According to another aspect of the present invention, there is provided a method for deinking through a flotation process using the foregoing deinking agent.

BEST MODE FOR CARRYING OUT THE INVENTION

The ether compound represented by the general formula I can be prepared by first adding propylene oxide to a higher alcohol having 12 to 22 carbon atoms, then adding ethylene oxide to the terminal hydroxyl groups of the product and further adding an XO, i.e., an alkylene oxide having not less than 3 carbon atoms. Thereafter, the resulting adduct may optionally be esterified by reacting the terminal hydroxyl groups thereof with a carboxylic acid having 2 to 24 carbon atoms. In this respect, the polyoxyalkylene group $(XO)_k$ obtained from a single XO or obtained through polymerization of the XO molecules is hydrophobic and the number of total carbon atoms thereof ranges from 3 to 120. The polyoxyalkylene group may be those obtained through block or random addition of at least two alkylene oxides as the XO components.

Examples of the alkylene oxides usable as the XO components each having not less than 3 carbon atoms include propylene oxide, butylene oxide, butadiene monooxide, hexylene oxide, styrene oxide and α-olefin oxides. Among these preferred are alkylene oxides having 3 to 30 carbon atoms, with propylene oxide being particularly preferred.

In the ether compound represented by the foregoing general formula I, the ratio of the molecular weight of the $(EO)_n$ moiety to that of the $(XO)_k-R^2$ moiety is preferably 0.2 to 2.0 and more preferably 0.3 to 1.8.

The ether compounds each having the foregoing structure and represented by the general formula I have high affinity for inks as compared with the conventional higher alcoholic deinking agents. For this reason, the ether compounds have strong ink-removing abilities and exert a high ink-removing effect on, in particular, offset inks which cannot easily be removed. Moreover, since the ether compound has $(EO)_n$ units and $(XO)_k-R^2$ units particularly selected and mixed in a specific ratio, the compound has high hydrophobicity and a high affinity for ink particles removed during the flotation process and is excellent in an ability of trapping fine ink particles having a particle size of not more than 4 μm. Thus, the deinking agent permits efficient separation and removal, from a pulp slurry, of ink particles removed from starting waste paper during the flotation process through adsorption of the particles on the foams thereof. As a result, the deinking agent permits the preparation of reclaimed pulp having high brightness, low somberness and a high b-value. If the molecular weight ratio exceeds 2.0, the hydrophilicity of the agent increases and accordingly, the agent is impaired in the affinity for ink particles and the ink-trapping ability observed during the flotation. On the other hand, if the ratio is less than 0.2, the deinking agent insufficiently causes foaming during the flotation process, thus foams cannot satisfactorily be scraped out and this results in the reduction of the ink-trapping ability during the flotation process. In addition, if the ratio falls within the range of from 0.3 to 1.8, the ink-trapping ability of the agent is further improved.

In Formula I, m=1~8; n=10~40; and k is such a number that the number of total carbon atoms present in the polymerized XO unit ranges from 3 to 120. They preferably range from 1 to 6; 12 to 35; and 15 to 120, respectively.

If XO is a propylene oxide unit and $R_2$ represents a hydrogen atom, the sum of m and k preferably ranges from 8 to 35, in particular 15 to 35.

When preparing the foregoing ether compounds in the present invention, it is preferred to adjust the moisture content in the reaction system to not more than 0.3% and to add, to the reaction system, a catalyst such as a basic catalyst (e.g., sodium hydroxide or potassium hydroxide) or a magnesium oxide-aluminum solid catalyst system in such an amount that the catalyst content relative to the intermediate in each alkylene oxide-addition step or the final product is controlled to a level of not more than 0.35% to thus adjust the content of by-products present in the final product, i.e., polyalkylene oxides such as polyethylene glycol, polypropylene glycol and ethylene oxide-propylene oxide copolymers to 0.3 to 3% by weight. Alternatively, polyalkylene glycols may be added to the final product in an amount falling within the range defined above, after the preparation of the foregoing ether compound.

As has been discussed above, it is preferred to use, as a deinking agent for the flotation process, those comprising 99.7 to 97% by weight of at least one of the foregoing ether compound and about 0.3 to 3% by weight of the foregoing by-products.

The higher alcohols constituting the alcohol residues of $R^1$ are those having 12 to 22 carbon atoms and preferably 16 to 22 carbon atoms, with straight-chain higher alcohols having 18 to 22 carbon atoms being more preferred. Examples of such higher alcohols include lauryl alcohol, myristyl alcohol, palmityl alcohol, stearyl alcohol, nonadecanol, elaidyl alcohol, behenyl alcohol, oleyl alcohol, alcohols derived from fatty acids of animal and vegetable oils such as tarrow oil alcohol, fish oil alcohol, lard oil alcohol and hardened products thereof.

R² represents a hydrogen atom or an acyl group having 2 to 24, preferably 2 to 12 carbon atoms, with hydrogen atom being particularly preferred.

If the higher alcohol moiety of the foregoing deinking agent has a number of carbon atoms less than the lower limit defined above, the alkyl group has a short chain length and the deinking agent in turn has insufficient hydrophobicity. Therefore, the foaming ability of the agent is insufficient even if the molecular weight ratio of ethylene oxide units to alkylene oxide units or acyl derivative thereof falls within the range defined above, the agent also shows an insufficient ability of trapping ink particles removed during the flotation process, cannot make to adhere ink particles to foams and cannot provide high quality reclaimed pulp having high brightness.

On the other hand, if the alkyl group has a chain length longer than the upper limit defined above, the deinking agent causes dissolution during the defibering step or shows low dispersibility. Thus, the agent cannot provide high quality reclaimed pulp having high brightness and a low content of residual ink.

If the molecular weight ratio of ethylene oxide units to alkylene oxide units or acyl derivative thereof is beyond the range defined above, the deinking agent never provides high quality reclaimed pulp and does not ensure stable workability of the deinking process even if the alkyl group of the compound represented by the general formula I has a carbon atom number falling within the foregoing range.

If the deinking process includes a defibering or aging step, the deinking agent can be used in the currently adopted deinking method by adding to either the defibering step or the aging step or by adding divisions thereof to these two steps.

As has been described above, the deinking processes are roughly divided into two groups, i.e., washing processes and flotation processes. Usually, the deinking process is roughly divided into defibering, aging and washing or flotation steps. The defibering and aging steps serve to remove ink in the form of fine particles and to disperse the ink particles in a pulp slurry. The washing step is carried out while the ink particles are dispersed as already described above, but in the flotation step, the dispersed ink particles must be agglomerated. In other wards, these washing and flotation steps require ink dispersion states contrary to one another. Therefore, the deinking agent used in the flotation step must satisfy the requirements of ink-removing ability, ink particle-dispersing ability and an ability of agglomerating the removed ink particles which conflict with each other, while the three steps, i.e., the defibering, aging and washing steps in the washing method require the use of deinking agents having the same properties.

Nevertheless, the problems associated with the conventional deinking methods can be solved through the use of the deinking agent represented by the general formula I according to the present invention.

The deinking agent of the present invention can be used in combination with polyoxyalkylene alkyl ether sulfates, alkylbenzenesulfonates, α-olefinsulfonates, fatty acids and salts thereof, alkylphenol-alkylene oxide adducts, fatty acid-alkylene oxide adducts, fats and oils-alkylene oxide adducts, alkylene oxide adducts of esterified products of fatty acids with triethanolamine, quaternized products of alkylene oxide adducts with esterified products of triethanolamine and fatty acids, alkylene oxide adducts of rosin acid, alkylene oxide adducts of formalin-condensate of alkylphenols, monostearyl glyceride-alkylene oxide adducts, triglyceride-alkylene oxide adducts and/or alkylene oxide adducts of pentaerythritol difatty acid esters.

Among these compounds, preferred are (b) compounds represented by the following general formula II or (c) higher fatty acids having 12 to 24 carbon atoms or salts thereof.

In particular, if the deinking agent of the present invention is used in combination with the compound (b) represented by the following general formula II, the foaming thereof during operations can appropriately be controlled. On the other hand, if the deinking agent of the present invention is used in combination with (c) the higher fatty acid having 12 to 24 carbon atoms or a salt thereof, the combination permits efficient removal of ink from printed waste paper during the defibering step and ensures a high ability of agglomerating removed ink particles and an appropriate degree of foaming and can provide reclaimed pulp having high brightness and a low content of residual ink.

$$R^3 \text{ O (AO) p S O}_3 \text{ M} \qquad (II)$$

(wherein $R^3$ represents an alkyl or alkenyl group having 12 to 24 carbon atoms; AO represents ethylene oxide and/or propylene oxide units; p is a number ranging from 1 to 8; M represents a hydrogen atom, an alkali metal, ammonium or an alkanolamine).

The compound (b) represented by the general formula II can be prepared by adding an alkylene oxide to a higher alcohol having 12 to 24 carbon atoms and then subjecting the terminal groups of the resulting adduct to sulfation. $R^3$ denotes an alkyl or alkenyl group having 12 to 24, preferably 12 to 16 carbon atoms. AO is an ethylene oxide or propylene oxide unit or a mixed unit thereof and the added molar number p thereof ranges from 1 to 8. When AO is a mixed unit of ethylene oxide or propylene oxide, the unit may be in a block or random configuration. The compound represented by Formula II having such a structure is excellent in a foaming ability during the flotation process. This sulfated product can be prepared by sulfating an alkylene oxide adduct of a higher alcohol with chlorosulfonic acid or sulfuric acid anhydride under the conditions currently used. In the present invention, the product thus obtained which is not yet neutralized may be used, but may, if desired, be neutralized with an alkali metal such as sodium or potassium, ammonium or an alkanolamine.

The compound (c) may be a saturated or unsaturated, linear or branched fatty acid having 12 to 24 carbon atoms or a salt thereof such as lauric acid, tridecanoic acid, myristic acid, pentadecanoic acid, margaric acid, palmitic acid, stearic acid, elaidic acid, behenic acid, oleic acid, linoleic acid, linolenic acid, tallow fatty acid, tallow hardened fatty acid, palm oil fatty acid and coconut oil fatty acid, which may be used alone or in combination. In addition, examples of the salts are alkali metal salts such as sodium and potassium salts, alkaline earth metal salts, ammonium salts and amine salts such as alkanolamine salts.

The ratio of the deinking agent (a) of the present invention to the compound (b) represented by Formula II and/or the compound (c) may arbitrarily be selected, but the compounding ratio (weight ratio) of the component (a) to the component (b) preferably ranges from 95/5 to 55/45 and particularly preferably 90/10 to 60/40. In other words, if the ratio falls within the range defined above, it is easy to adjust the quantity of foams generated, the quality of the resulting reclaimed pulp is not impaired due to a decrease of the ink-trapping ability during the flotation process and the deinking agent can ensure stable workability of the deinking process.

On the other hand, the weight ratio of the component (a) to the component (c) likewise preferably ranges from 90/10 to 60/40 and particularly preferably 90/10 to 70/30. If the components (b) and (c) are simultaneously used, the weight ratio of the total amount of the components (a) and (c) to the amount of the component (b) is preferably adjusted to the range of from 95/5 to 55/45. In other words, if the ratio falls within the range defined above, it is easy to adjust the quantity of foams generated, the quality of the resulting reclaimed pulp is not impaired due to a decrease of the ink-trapping ability during the flotation process and the deinking agent can ensure stable workability of the deinking process.

The deinking agent of the present invention may further comprise a high molecular weight surfactant, a high molecular weight dispersing-agglomerating agent and/or an enzyme.

The deinking agent (a), a mixture of the components (a) and (b), a mixture of the components (a) and (c) or a mixture of the components (a), (b) and (c) may be added to either the waste paper-defibering step or the aging step, or divisions thereof may be added to these two steps. Alternatively, satisfactory results can likewise be ensured by separately adding the component (a) to the defibering step and the components (b) and/or (c) to the flotation process, respectively insofar as the mixing ratio during the flotation process falls within the range defined above. The amount thereof to be added is preferably adjusted to 0.1 to 2% by weight (hereunder simply referred to as "%") based on the weight of the starting waste paper used.

The use of the deinking agent in an amount falling within the range defined above permits the production of high quality reclaimed pulp exhibiting high brightness and a low content of residual ink and can ensure stable operations of the deinking process.

When a deinking process is carried out using the deinking agent of the present invention, an alkaline agent such as sodium hydroxide, sodium silicate or sodium carbonate and an optional bleaching agent such as hydrogen peroxide may be used in the defibering step in addition to the deinking agent of the present invention and the combination is preferably used under the conditions of a pulp consistency ranging from 4 to 25%, a temperature ranging from 20° to 70° C. and a pH value ranging from 7.5 to 11.5, preferably 8.0 to 11.5. If the pulp consistency is not more than 3% or the temperature is not more than 20° C., the frictional force acting between pulp fibers during the defibering step is insufficient. This leads to increases in the amount of non-defibering pulp and in the content of residual ink and this in turn results in the production of a practically unacceptable feedstock for papermaking. On the other hand, if the pulp consistency is not less than 25% and the temperature is not less than 70° C., the frictional force acting between pulp fibers during the defibering step becomes extremely strong, the resulting reclaimed pulp, in turn, has low strength due to heat generated through the friction and thus any reclaimed pulp of high quality cannot be obtained. Moreover, if the pH value during the defibering step is not more than 7.5, the degree of swelling of pulp fibers is low during the defibering step, the amount of non-defibering pulp is correspondingly increased, in turn, the resulting feedstock for paper making is not practically acceptable, further the content of residual ink increases and thus any reclaimed pulp of high quality cannot be prepared. On the other hand, if pH is not less than 11.5, the resulting pulp suffers from yellowing through the alkali-yellowing and this results in the reduction of brightness and a decrease of the strength.

Moreover, the aging process can be performed in the presence of the same agent used in the defibering step. The aging step is preferably carried out at a pulp consistency ranging from 10 to 30%, a temperature ranging from 30° to 80° C. for not less than one hour. If the pulp consistency is not more than 10% and the temperature is not more than 30° C., a sufficient aging effect cannot be ensured and accordingly, any reclaimed pulp of high quality cannot be prepared. In addition, if the temperature is not less than 80° C., the strength of the resulting reclaimed paper is impaired due to heat. Moreover, the use of a pulp consistency of not less than 30% does not provide a sufficient wet state of the starting pulp fibers and accordingly, does not ensure a sufficient aging effect.

The removed ink particles can efficiently be separated from the pulp slurry by carrying out the flotation process at a pulp consistency ranging from 0.5 to 1.5% and a temperature ranging from 20° to 45° C.

Moreover, even if the deinking process includes other steps currently used in the deinking process such as a dilution-dehydration process or a treatment with a screen, a disperser and/or a kneader, the deinking agent of the present invention does not exert any influence on the quality of the reclaimed pulp and the operating efficiency, and the deinking agent may be added to a process for removed ink such as a treatment in a kneader, a refiner and/or disperser, in addition to the foregoing defibering and aging steps.

The present invention is excellent in the ability of removing ink particles adhered to pulp fiber of printed waste paper such as newspaper, magazine, wood free paper, computer printout paper and copying paper and in the ink particle-trapping ability. In particular, the present invention can make the flotation method excellent in the deinking characteristics and can provide high quality reclaimed pulp having high brightness and a low content of residual ink and can ensure stable operations in the deinking process free of any troubles due to foams.

The use of the deinking agent of the present invention in the deinking process according to the washing method ensures stable operations free of any troubles due to foams and can provide high quality reclaimed pulp having high brightness and a low content of residual ink, as compared with the usual methods or the methods which make use of ethylene oxide-propylene oxide adducts of higher alcohols as disclosed in gazetted patents.

The present invention will hereunder be described in more detail with reference to the following Examples, but the present invention is not limited to these specific Examples at all.

PREPARATION EXAMPLE

Stearyl alcohol (one mole) and a catalytic amount of KOH were introduced into an autoclave and then the interior of the reaction system was sufficiently replaced with nitrogen gas, followed by dehydration under a reduced pressure to adjust the moisture content in the system to 0.13%, addition of propylene oxide (4 moles) at 125° C. and a pressure of not more than 3.0 kg/cm² and aging to give a PO-adduct. Subsequently, 20 moles of ethylene oxide were added to the PO-adduct at 160° C. and a pressure of not more than 3.0 kg/cm² and then aged to give a PO-EO adduct. Further, 25 moles of propylene oxide were added to the adduct at 125° C. and a pressure of not more than 3.0 kg/cm² and then aged to give a PO-EO-PO adduct (deinking agent No. 1).

Deinking agent Nos. 2 to 12 were prepared according to the same procedures used in the Preparation Example described above except for using conditions listed in the following Table 1.

TABLE 1

$R^1O$—(PO)m—(EO)n—(XO)k—$R^2$

| Deinking Agent No. | Alkyl Group | m/n | Sum of C atoms in (XO) K—$R^2$ | $M_1/M_2$ | By-Product |
|---|---|---|---|---|---|
| 1 | $C^{18}$ | 4/20 | 75 | 0.61 | 1.23 |
| 2 | $C^{16}$ | 2/30 | 60 | 1.13 | 2.15 |
| 3 | $C^{16}/C^{18}$ = 50/50 | 3/35 | 45 | 1.77 | 1.56 |
| 4 | $C^{18}$ | 5/15 | 81 | 0.42 | 1.87 |
| 5 | $C^{18}/C^{22}$ = 50/50 | 1/13 | 99 | 0.30 | 2.23 |
| 6 | $C^{18}$ | 6/22 | 51 | 0.98 | 2.56 |
| 7 | $C^{18}$ | 3/33 | 48 | 1.56 | 1.76 |
| 8 | $C^{16}/C^{18}$ = 30/70 | 4/30 | 80 | 0.87 | 1.64 |
| 9 | $C^{12}$ | 6/18 | 33 | 1.24 | 2.46 |
| 10 | $C^{18}$ | 3/20 | 62 | 0.78 | 1.68 |
| 11 | $C^{16}$ | 10/45 | 30 | 3.41 | 2.89 |
| 12 | $C^{14}$ | 5/8 | 120 | 0.15 | 2.46 |

*$M_1$ represents the molecular weight of the (EO)n unit $M_2$ represents the molecular weight of the (XO)k—$R^2$ unit XO represents a propylene oxide (PO) or butylene oxide (BO) unit and $R^2$ represents a hydrogen atom (deinking agent Nos. 1 to 9, 11 and 12) or a methyl ester group (No. 10). In this respect, deinking agent No. 8 is a PO/BO random adduct.

TABLE 2

| Deinking Agent No. | Chemical Structure |
|---|---|
| 13 | $C_{18}H_{37}O$ (EO)$_{30}$(PO)$_{10}$H |
| 14 | $C_{20}H_{41}O$ (PO)$_{10}$(EO)$_{20}$H |
| 15 | $C_{15}H_{31}COO$ (EO)$_{20}$(PO)$_{10}$H |
| 16 | $C_{17}H_{35}COO$ (EO)$_{25}$H |
| 17 | $C_{16}H_{33}O$ (PO)$_{30}$[(EO)$_{42}$/(PO)$_9$] H |
| 18 | $C_{16}H_{33}O$ (EO)$_{20}$(BO)$_{30}$H |
| 19 | $C_{18}H_{37}O$ (PO)$_{20}$(EO)$_{30}$H |

*[ ]: Random Addition;   BO: butylene oxide unit

EXAMPLE 1

Printed waste paper (weight ratio: offset-printed newspaper/magazine=7/3) as a starting material was cut into pieces having a size of 3×3 cm and then introduced into a pulper (available from Kumagai Riki Kogyo K.K.), followed by addition of warmed water to adjust the temperature to 50° C. and the pulp consistency to 15% and control of the pH value to 10.6 with sodium hydroxide and sodium silicate. Then 0.2% of each deinking agent listed in Table 1 or Table 2 was added thereto and the resulting mixture was defibered for 10 minutes. The resulting pulp slurry was dehydrated through centrifugation using an 80 mesh filter cloth to adjust the pulp consistency to 20%, followed by control of the pH value to 11 through addition of sodium hydroxide and sodium silicate. Thereafter, hydrogen peroxide and the deinking agent were added to the pulp slurry in amounts of 1.5% and 0.15% respectively and then the slurry was aged at 50° C. for 2 hours in a thermostatic chamber. After completion of the aging, water was again added to the slurry to adjust the pulp consistency to 1% and then the slurry was subjected to flotation at 35° C. for 7 minutes in a Denver Type flotator (available from Kyokuto Shinko Sha). Then the pulp slurry was concentrated to a pulp consistency of 10% using an 80 mesh filter cloth, then diluted to 1% with water and processed into a pulp sheet using a TAPPI sheet machine.

The degree of brightness and the b-value of the resulting pulp sheet were determined by a color measurement color difference meter (available from Nippon Denshoku Kogyo K.K.) according to the method defined by JIS P-8123, while the content of residual ink was evaluated in terms of the number of ink particles having a particle size of not more than 4 μm which was determined by an image analyzer (LUZEX available from Nireko Co., Ltd.). The results thus obtained are summarized in the following Table 3. The term "b-value" herein means the b-value in the Hunter's Lab color specification system. The smaller the amount of fine ink particles, the higher the b-value. This value serves as an index for the amount of fine ink particles present.

TABLE 3

| Experiment No. | Deinking Agent No. | Degree of Brightness | No. of Residual Ink Particles (<4 μm) | b-Value |
|---|---|---|---|---|
| 1 | No. 1 | 57.8 | 182 | 7.8 |
| 2 | No. 3 | 57.2 | 207 | 7.2 |
| 3 | No. 5 | 57.4 | 199 | 7.5 |
| 4 | No. 6 | 58.0 | 174 | 8.0 |
| 5 | No. 8 | 57.7 | 220 | 7.0 |
| 6 | No. 11 | 53.3 | 764 | 4.6 |
| 7 | No. 12 | 51.7 | 946 | 3.5 |
| 8 | No. 13 | 53.6 | 732 | 4.8 |
| 9 | No. 16 | 52.4 | 861 | 4.0 |

Experiment Nos. 1 to 5: Present Invention;
Experiment Nos. 6 to 9: Comparative Examples

EXAMPLE 2

Printed waste paper (weight ratio: offset-printed newspaper/magazine=7/3) as a starting material was cut into pieces having a size of 3×3 cm and then introduced into a pulper (available from Kumagai Riki Kogyo K.K.), followed by addition of warmed water to adjust the temperature to 50° C. and the pulp consistency to 5% and control of the pH value to 10.4 with sodium hydroxide and sodium silicate. Then 0.2% of each deinking agent listed in Table 1 or Table 2 was added thereto and the resulting mixture was defibered for 15 minutes. The resulting pulp slurry was dehydrated through centrifugation using an 80 mesh filter cloth to adjust the pulp consistency to 15%, followed by control of the pH value to 11.2 through addition of sodium hydroxide and sodium silicate. Thereafter, hydrogen peroxide and the deinking agent were added to the pulp slurry in amounts of 1.5% and 0.15% respectively and then the slurry was aged at 50° C. for 2 hours in a thermostatic chamber. After completion of the aging, water was again added to the slurry to adjust the pulp consistency to 1% and then the slurry was subjected to flotation at 35° C. for 7 minutes in a Denver Type flotator (available from Kyokuto Shinko Sha). Then the pulp slurry was concentrated to a pulp consistency of 10% using an 80 mesh filter cloth, then diluted to 1% with water and processed into a pulp sheet using a TAPPI sheet machine.

The degree of brightness and the b-value of the resulting pulp sheet were determined by a color measurement color difference meter (available from Nippon Denshoku Kogyo K.K.) according to the method defined by JIS P-8123, while the content of residual ink was evaluated in terms of the number of ink particles having a particle size of not more than 4 μm which was determined by an image analyzer (LUZEX available from Nireco Co., Ltd.). The results thus obtained are summarized in the following Table 4. The term "b-value" herein means the b-value in the Hunter's Lab color specification system. The smaller the amount of fine ink particles, the higher the b-value. This value serves as an index for the amount of fine ink particles present.

TABLE 4

| Experiment No. | Deinking Agent No. | Degree of Brightness | No. of Resicual Ink Particles (<4 μm) | b-Value |
| --- | --- | --- | --- | --- |
| 1 | No. 2 | 57.5 | 187 | 7.6 |
| 2 | No. 4 | 57.7 | 183 | 7.7 |
| 3 | No. 7 | 57.3 | 201 | 7.3 |
| 4 | No. 9 | 57.0 | 214 | 7.0 |
| 5 | No. 10 | 57.1 | 209 | 7.1 |
| 6 | No. 14 | 51.9 | 921 | 3.6 |
| 7 | No. 15 | 52.6 | 843 | 4.2 |
| 8 | No. 17 | 53.2 | 774 | 4.4 |
| 9 | No. 18 | 53.4 | 753 | 4.5 |
| 10 | No. 19 | 52.2 | 887 | 3.8 |

Experiment Nos. 1 to 5: Present Invention;
Experiment Nos. 6 to 10: Comparative Examples

EXAMPLE 3

Printed waste paper as a starting material (weight ratio:offset-printed waste paper/letterpress-printed waste paper/leaflet=4/3/3) was cut into pieces having a size of 3×3 cm, charged into a pulper. There were added, on the basis of the weight of the waste paper, 1.0% of sodium hydroxide, 3.5% of sodium silicate (No. 3), 1.0% (effective component) of hydrogen peroxide and 0.35% of the deinking agent listed in Tables 5 and 6 in a ratio of addition detailed in Table 7 to the pulper, followed by addition of warmed water in an amount sufficient to adjust the pulp consistency to 5% and defibering at 35° C. for 7 minutes. The resulting pulp slurry was soaked at 65° C. for 60 minutes, added warmed water in an amount sufficient to adjust the pulp consistency of the slurry to 1%, followed by flotation at 30° C. for 7 minutes. After the flotation, the pulp slurry was concentrated to 10% and then diluted to 1% with water, followed by preparation of a pulp sheet from the pulp slurry using a TAPPI sheet machine. In this respect, the pH value during the defibering was found to be 10.2 while that during the soaking was found to be 10.0. The brightness of the resulting pulp sheet was determined by a color measurement color difference meter and the amount of the residual ink was evaluated in terms of the degree of area on the pulp sheet carrying the residual ink which was determined by an image analyzer. The results thus obtained are summarized in the following Table 7. In Table 7, "Workability During Flotation (Foam)" was evaluated on the basis of the following evaluation criteria:

A: good workability;

B: The amount of foams was slightly high, but the workability was not affected at all.

C: The amount of foams was slightly low, but the workability was not affected at all.

D: The amount of foams was too high to conduct deinking.

E: The amount of foams was too low to conduct deinking.

TABLE 5

Component (a) of the Deinking Agent
$R^1O-(PO)m-(EO)n-(XO)k-R^2$

| Deinking Agent No. | Alkyl Group | m/n | Sum of Carbon Atoms in $(XO)k-R^2$ | $M_1/M_2$ | By-Product (wt %) |
| --- | --- | --- | --- | --- | --- |
| a - 1 | $C_{18}$ | 4/25 | 45 | 1.26 | 1.75 |
| a - 2 | $C_{16}$ | 6/15 | 60 | 0.61 | 2.87 |
| a - 3 | $C_{22}$ | 1/35 | 46 | 1.71 | 1.29 |
| a - 4 | $C_{16/18}$ (40/60) | 5/20 | 105 | 0.43 | 2.31 |

*$M_1$ represents the molecular weight of the (EO)n unit. $M_2$ represents the molecular weight of the $(XO)k-R^2$ unit.

XO represents a propylene oxide (a-1, 3, 4) or butylene oxide (a-2) unit and $R^2$ represents a hydrogen atom (a-1, 2, 4) or a methyl ester group (a-3). The deinking agents listed in Table 5 were prepared in accordance with the method described in the Preparation Example.

TABLE 6

Component (b) of Deinking Agent $[R^3O(AO)pSO_3M]$

| No. | $R^3$ Alkyl Group | AO*) Kind and Added Molar Number p | Kind of M |
| --- | --- | --- | --- |
| b-1 | $C_{12}$ | $PO_1$ | sodium |
| b-2 | $C_{12/13}$ (50/50) | $EO_4/PO_3$ (Random) | monoethanolamine |
| b-3 | $C_{14/16}$ (80/50) | $EO_5$ | ammonium |

*): EO represents an ethylene oxide unit and PO represents a propylene oxide unit.

TABLE 7

Results of Evaluation

| No. | a/b (weight ratio) | Whiteness Degree | No. of Remaining Ink *) | Workability |
| --- | --- | --- | --- | --- |
| 1 | a-1/b-1 = 90/10 | 56.2 | 0.363 | C |
| 2 | a-2/b-2 = 70/30 | 56.6 | 0.338 | A |
| 3 | a-3/b-3 = 60/40 | 56.4 | 0.341 | B |
| 4 | a-4/b-1 = 80/20 | 55.9 | 0.379 | A |
| 5 | a-2/b-2 = 50/50 | 54.6 | 0.517 | B |
| 6 | a-3 | 53.5 | 0.624 | C |
| 7 | b-1 | 51.4 | 1.135 | D |
| 8 | $C_{12}H_{25}OEO_3(EO_{24}/PO_{16})H$ (block · random adduct) | 52.7 | 0.987 | D |
| 9 | $C_{18}H_{37}OPO_{20}(EO_{30}/PO_{25})H$ (block · random adduct) | 52.1 | 1.094 | D |
| 10 | $C_4H_9O(PO_{27}/EO_3)EO_{30}H$ (random · block adduct) | 51.6 | 1.104 | E |
| 11 | $C_{12}H_{25}OPO_3SO_3Na/$ $C_{18}H_{37}OEO_{25}PO_{10}H$ (block adduct) = 3/7 | 52.8 | 0.979 | B |

No. 1~6: Present Invention;
No. 7~11: Comparative Examples.
*): Expressed in terms of number/field.

In Table 7, EO and PO represent ethylene oxide and propylene oxide units respectively.

EXAMPLE 4

Printed waste paper as a starting material (weight ratio:offset-printed waste paper/letterpress-printed waste paper/leaflet=4/3/3) was cut into pieces having a size of 3×3 cm, charged into a pulper. There were added, on the basis of the weight of the starting waste paper, 1.0% of sodium hydroxide, 3.5% of sodium silicate (No. 3), 1.0% (effective component) of hydrogen peroxide and 0.35% of the deinking agent listed in Tables 8 and 9 in a ratio of addition detailed in Table 10 to the pulper, followed by addition of warmed water in an amount sufficient to adjust the pulp consistency to 15% and defibering at 55° C. for 15 minutes. The resulting pulp slurry was soaked at 65° C. for 60 minutes, followed by addition of water and defibering at a pulp consistency of 5% for one minute. Thereafter, warmed water was added to the slurry in an amount sufficient to dilute the pulp consistency of the slurry to 1%, followed by flotation at 30° C. for 7 minutes. After the flotation, the pulp slurry was concentrated to 10% and then diluted to 1% with water, followed by preparation of a pulp sheet from the pulp slurry using a TAPPI sheet machine. In this respect, the pH value during the defibering was found to be 10.4 while that observed during the soaking was found to be 10.3. The brightness of the resulting pulp sheet was determined by a color measurement color difference meter and the degree of area on the pulp sheet carrying the residual ink was determined by an image analyzer. The results thus obtained are summarized in the following Table 10. In this Table, the term "Somberness" reflects the fact that the brightness of the resulting reclaimed paper is not necessarily proportional to the visually observed color tone thereof. For this reason, each pulp sheet was visually evaluated on the basis of the following three evaluation criteria:

1: severely somber; 2: slightly somber; 3: free of somberness.

In addition, "Workability During Flotation (Foam)" was evaluated on the basis of the same evaluation criteria used in Example 3.

TABLE 8

Component (a) of Deinking Agent
$R^1O$—$(PO)m$—$(EO)n$—$(XO)k$—$R^2$

| Deinking Agent No. | Alkyl Group | m/n | Sum of Carbon Atoms in $(XO)_k$—$R^2$ | $M_1/M_2$ | By-Product (wt %) |
|---|---|---|---|---|---|
| a-11 | $C_{18}$ | 3, 30 | 42 | 1.62 | 0.56 |
| a-12 | $C_{20}$ | 1, 35 | 60 | 1.32 | 1.98 |
| a-13 | $C_{16}$ | 4, 25 | 60 | 1.02 | 1.37 |
| a-14 | $C_{22}$ | 6, 12 | 92 | 0.36 | 2.81 |

* $M_1$ represents the molecular weight of the $(EO)_n$ unit.
$M_2$ represents the molecular weight of the $(XO)_k$—$R^2$ unit.

XO represents a propylene oxide (a-11, 12, 14) or butylene oxide (a-13) unit and $R^2$ represents a hydrogen atom (a-11 to 13) or a methyl ester group (a-14). The deinking agents listed in Table 8 were prepared in accordance with the method described in Preparation Example.

TABLE 9

Component (b) of Deinking Agent: $[R^3O(AO)pSO_3M]$

| No. | $R^3$ Alkyl group | AO*) Kind and Added Molar Number p | Kind of M |
|---|---|---|---|
| b-11 | $C_{14}$ | $EO_3$ | potassium |
| b-12 | $C_{12}$ | $PO_5$ $EO_3$ (block) | sodium |
| b-13 | $C_{12-15}$ | $EO_2$ $PO_2$ (random) | triethanolamine |

*)EO represents an ethylene oxide unit and PO represents a propylene oxide unit.

TABLE 10

Results of Evaluation

| No. | Component a/Fatty Acid/ Component b (weight ratio) | Whiteness Degree | No. of Remaining Ink*) | Somberness | Workability |
|---|---|---|---|---|---|
| 1 | a-11/stearic acid (90/10) | 56.2 | 0.241 | 3 | C |
| 2 | a-13/Na-tallow fatty acid (60/40) | 56.7 | 0.216 | 3 | C |
| 3 | a-12/hardened tallow fatty acid/ b-11 (81/9/10) | 57.0 | 0.208 | 3 | A |
| 4 | a-11/K-palm oil fatty acid/b-12 (60/15/25) | 57.5 | 0.165 | 3 | A |
| 5 | a-14/coconut oil fatty acid/b-13 (36/24/40) | 57.3 | 0.182 | 3 | B |
| 6 | a-14 | 55.8 | 0.274 | 2 | C |
| 7 | b-11 | 51.9 | 1.158 | 1 | D |
| 8 | tallow oil alcohol $PO_5EO_{10}H$/ K-tallow fatty acid (80/20) | 52.2 | 1.094 | 2 | A |
| 9 | $C_{18}H_{37}O(EO_{40}/PO_{10})H$ (R-form)/ stearic acid (50/50) | 52.5 | 1.047 | 2 | E |
| 10 | $C_{18}H_{37}OEO_{15}PO_5H$/linoleic acid/ $C_{12}H_{25}OPO_2SO_3NH_4$ (65/10/25) | 53.1 | 0.973 | 2 | A |

No. 1~6: Present Invention;
No. 7~10: Comparative Examples.
*): Expressed in terms of number/field.
R-form: Random form.

What is claimed is:

1. A deinking agent comprising a compound represented by the following general formula I:

$$R^1O\text{—}(PO)m\text{—}(EO)n\text{—}(XO)k\text{—}R^2 \qquad (I)$$

wherein $R^1$ represents an alkyl or alkenyl group having 12 to 22 carbon atoms; $R^2$ represents a hydrogen atom; PO, EO and XO represent a propylene oxide unit, an ethylene oxide unit and an alkylene oxide unit having not less than 3 cabon atoms, respectively; m=1~8; n=10~40; and k is such a number that the number of total carbon atoms present in the polymerized XO unit ranges from 3 to 120; the PO and EO in Formula I being added through block-addition.

2. The deinking agent of claim 1 wherein XO represents a propylene oxide unit.

3. The deinking agent of claim 1 wherein the ratio of the molecular weight of the (EO)n unit to that of the (XO)k -$R^2$ unit ranges from 0.2 to 2.0.

4. The deinking agent of claim 1 wherein, in Formula I, m=1~6, n=12~35 and k is such a number that the number of total carbon atoms present in the polymerized XO unit ranges from 15 to 120.

5. The deinking agent of claim 1 wherein the higher alcohol constituting the alcohol residue of $R^1$ is a straight chain higher alcohol having 16 to 22 carbon atoms.

6. The deinking agent of claim 1 wherein $R^2$ represents a hydrogen atom or an acyl group having 2 to 12 carbon atoms.

7. The deinking agent of claim 2 wherein $R^2$ is a hydrogen atom and the sum of m and k ranges from 8 to 35.

8. The deinking agent of claim 1 further comprising (c) a higher fatty acid having 12 to 24 carbon atoms or a salt thereof.

9. The deinking agent of claim 8 comprises compound (a) of Formula I and the compound (c) in a weight ratio, (a)/(c), ranging from 90/10 to 60/40.

10. The deinking agent of claim 1 comprising 99.7 to 97% by weight of the compound of Formula I and 0.3 to 3% by weight of polyalkylene oxides as by-products.

11. A method for deinking waste paper through flotation comprising adding a deinking agent represented by the following general formula I to a waste paper-defibering step or an aging step or the both steps included in a flotation process, in an amount ranging from 0.1 to 2% by weight on the basis of the weight of starting waste paper:

$$R^1O\text{—}(PO)m\text{—}(EO)n\text{—}(XO)k\text{—}R^2 \qquad (I)$$

wherein $R^1$ represents an alkyl or alkenyl group having 12 to 22 carbon atoms; $R^2$ represents a hydrogen atom; PO, EO and XO represent a propylene oxide unit, an ethylene oxide unit and an alkylene oxide unit having not less than 3 cabon atoms, respectively; m=1~8; n=10~40; and k is such a number that the number of total carbon atoms present in the polymerized XO unit ranges from 3 to 120; the PO and EO in Formula I being added through block-addition.

12. The deinking method of claim 11 wherein the waste paper-defibering step is carried out at a pulp consistency ranging from 4 to 25%, a temperature ranging from 20° to 70° C. and a pH value ranging from 7.5 to 11.5.

13. The deinking method of claim 11 wherein the aging step is carried out at a pulp consistency ranging from 10 to 30% and a temperature ranging from 30° to 80° C. for not less than one hour.

14. The deinking method of claim 11 wherein the deinking agent used comprises 99.7 to 97% by weight of the compound of Formula I and 0.3 to 3% by weight of polyalkylene oxides as by-products.

15. The deinking method of claim 14 wherein the deinking agent used comprises the compound represented by Formula I and a higher fatty acid having 12 to 24 carbon atoms or a salt thereof.

* * * * *